(12) United States Patent
Cuddeback

(10) Patent No.: US 8,973,751 B2
(45) Date of Patent: Mar. 10, 2015

(54) PROTECTIVE CASE FOR A WILDLIFE SURVEILLANCE SYSTEM

(75) Inventor: Brian Cuddeback, Park Falls, WI (US)

(73) Assignee: Non Typical Inc., Park Falls, WI (US)

( * ) Notice: Subject to any disclaimer, the term of this patent is extended or adjusted under 35 U.S.C. 154(b) by 931 days.

(21) Appl. No.: 12/024,736

(22) Filed: Feb. 1, 2008

(65) Prior Publication Data

US 2009/0194443 A1 Aug. 6, 2009

(51) Int. Cl.
  B65D 85/38 (2006.01)
  G03B 17/08 (2006.01)
  G03B 17/56 (2006.01)

(52) U.S. Cl.
  CPC ............. G03B 17/08 (2013.01); G03B 17/568 (2013.01)
  USPC ...................................... 206/316.2; 396/427

(58) Field of Classification Search
  USPC .................. 206/315.1, 316.2, 1.5, 464, 482, 206/315.11; 220/475, 476, 480, 300, 229, 220/730, 3.2, 3.5, 3.6, 3.8, 3.9, 3.92, 3.94, 220/4.02, 4.21, 4.24, 4.33, 482, 481, 315, 220/322, 3.3, 324; 396/153, 433, 427, 265, 396/25, 27, 419, 428; 348/373, 151; 365/25; 439/133
  See application file for complete search history.

(56) References Cited

U.S. PATENT DOCUMENTS

| | | | | |
|---|---|---|---|---|
| 1,672,683 A * | 6/1928 | Knoderer | ..................... | 220/3.8 |
| 1,793,861 A * | 2/1931 | Mallgraf | ...................... | 40/539 |
| 2,008,104 A * | 7/1935 | Juvinall | ..................... | 220/4.02 |
| 2,332,017 A * | 10/1943 | Sedgwick | ..................... | 220/3.8 |
| 3,618,804 A * | 11/1971 | Krause | .................. | 220/3.8 |
| 4,548,330 A * | 10/1985 | Hewitt et al. | ................ | 220/210 |
| 4,875,595 A * | 10/1989 | Van Valkenburg | ............ | 220/1.5 |
| 5,455,625 A * | 10/1995 | Englander | ..................... | 348/375 |
| 5,623,778 A | 4/1997 | Dunn | | |
| 5,826,957 A * | 10/1998 | DeBartolo et al. | ............ | 312/326 |
| 5,878,283 A * | 3/1999 | House et al. | ....................... | 396/6 |
| 5,938,037 A * | 8/1999 | Essary | ......................... | 206/600 |
| 6,128,441 A * | 10/2000 | Kamata et al. | ................... | 396/25 |
| 6,449,431 B1 * | 9/2002 | Cuddeback et al. | ............ | 396/27 |
| 6,520,405 B1 | 2/2003 | Braxter | | |
| 6,768,868 B1 * | 7/2004 | Schnell | ........................ | 396/263 |
| 6,953,149 B2 | 10/2005 | Taylor | | |
| 7,066,662 B2 * | 6/2006 | Cuddeback et al. | .......... | 396/427 |
| 7,175,071 B1 | 2/2007 | Slagle et al. | | |
| 7,308,196 B2 * | 12/2007 | Schnell | ......................... | 396/153 |
| 7,345,707 B1 * | 3/2008 | McClain | ....................... | 348/373 |
| 2002/0140850 A1 * | 10/2002 | Toste et al. | ................... | 348/375 |
| 2002/0159770 A1 * | 10/2002 | Moultrie, Jr. | ................. | 396/265 |

(Continued)

OTHER PUBLICATIONS

Dietrich Metal Framing (http://www.dietrichindustries.com/canada/products/pdf/can/canada_4_207.pdf).*

*Primary Examiner* — Jacob K Ackun
*Assistant Examiner* — Jenine Pagan
(74) *Attorney, Agent, or Firm* — Jansson Munger McKinley & Shape Ltd.

(57) ABSTRACT

A protective case that resists fractures, punctures, deformations, and other failures for use with a wildlife surveillance system is provided. The protective case includes a cooperating base and cover. The base and cover define a cavity therebetween, which houses the wildlife surveillance system. The base and cover interlock with each other, providing multi-dimensional stability of the entire assemblage. In addition, the protective case is made from a material that can endure manipulations, handling, or attacks from various wildlife animals, including, e.g., bears and others.

13 Claims, 3 Drawing Sheets

(56) References Cited

U.S. PATENT DOCUMENTS

| | | |
|---|---|---|
| 2004/0165873 A1* | 8/2004 | Cuddeback et al. ............ 396/25 |
| 2004/0245122 A1* | 12/2004 | Newenham ................... 206/0.8 |
| 2006/0000971 A1* | 1/2006 | Jones et al. ................... 250/239 |
| 2007/0019941 A1* | 1/2007 | Cross et al. ................... 396/263 |
| 2007/0172227 A1* | 7/2007 | Droege et al. ................. 396/419 |

* cited by examiner

PROTECTIVE CASE FOR A WILDLIFE SURVEILLANCE SYSTEM

BACKGROUND OF THE INVENTION

1. Field of the Invention

The present invention relates to apparatus for scouting potential hunting areas and determining game patterns and, more particularly, structures for enclosing and protecting wildlife surveillance systems.

2. Discussion of the Prior Art

Apparatus for scouting potential hunting areas and determining game patterns, particularly without disturbing animal activity, are generally well known in the art. Typically, the apparatus includes a film or digital camera and a passive infrared sensor (e.g., a motion/heat sensor) that is adapted to sense movement and, in response, activate the camera focused on the area in which the sensor detects movement. Oftentimes, these devices include a delay timer with multiple settings to match specific conditions or locations, thus eliminating multiple exposures or other non-desired events. Moreover, such apparatus preferably includes high/low sensitivity settings to allow adjustment of the camera's effective range in order to photograph or record game at any distance up to, for example, sixty (60) feet.

In addition, such systems are typically mounted in an enclosure that is adapted to be strapped to, for example, a tree or other mounting substrate. However, the components of the surveillance apparatus must periodically be accessed to, e.g., check battery status, check digital storage media, change film, or otherwise. Accordingly, the enclosure is typically designed for ready entry to its interior. For example, a door may be included to provide access to its interior. Moreover, the enclosure typically includes openings or windows to accommodate, for example, a view path for the camera and sensor of the apparatus. Also, all the components are preferably sealed in the enclosure to protect the components from the environment.

Typically, the protection from the elements and sealed configuration is facilitated by making the housing components from various polymeric materials. The polymeric components are connected to each other with intervening seals, thus providing the sealed assemblage. Such polymeric materials do not corrode and are desirably lightweight.

To make its appearance inconspicuous, the enclosure is typically appropriately colored/contoured to camouflage the unit. Because the surveillance apparatus is oftentimes left out in the woods for extended periods of time, the camouflage not only hides the unit from unsuspecting game, it also helps to prevent theft of, or tampering with, the apparatus. Nevertheless, even if camouflaged, security is a concern.

Most known units typically also include a latch and locking mechanism, thus making it difficult to break into the enclosure which houses the expensive surveillance apparatus, including the sensor, camera, and electronics. However, known systems do not always address the problem of theft of the entire apparatus from where it is mounted. Although the camouflage look of the enclosures in conjunction with the enclosure locking mechanisms is oftentimes sufficient to avoid theft of the units, such is not always the case.

Regardless of the particular locking mechanism employed, occasionally, the enclosure can be subjected to forces that are so large in magnitude that the unit can be separated from its respective locking mechanism or mounting substrate by exceeding the material property limitations of the enclosure. In other words, due to the polymeric or lightweight metallic material of the enclosure, when subjected to relatively large forces, the enclosure itself can break, puncture, fracture, crush, deform, and/or otherwise fail, which often ruins the complex and expensive components of the wildlife surveillance system.

Some end use environments expose wildlife surveillance systems to a higher likelihood of encountering relatively large forces. Such large forces can result from or be delivered by, e.g., storms or other extreme weather conditions. Moreover, various wildlife animals will, on occasion, meddle with the wildlife surveillance systems, subjecting them to large forces.

For example, some wildlife animals, including the American black bear and others, can at times be rather inquisitive or curious about items it does not typically encounter in its habitat. Accordingly, upon discovering a wildlife surveillance system, an American black bear may investigate, examine, or otherwise explore, the device. Since the wildlife surveillance systems are typically mounted and secured, frequently locked, to a tree or other mounting substrate, the bear can become aggravated or frustrated if it tries to remove the system from the mounting substrate.

Correspondingly, an American black bear will, on occasion, resort to handling the wildlife surveillance system aggressively or forcefully. In light of the size and strength of American black bears, mature bears often being between 400-600 pounds or more, they are capable of exerting very large forces upon the surveillance system. Bear teeth and claws have relatively small surface area(s), enabling bears to transfer great loads and forces through rather localized applications.

Accordingly, meddling bears can severely damage the polymeric or thin metallic enclosure of a wildlife surveillance system. Biting, scratching, striking, or attacking can break, puncture, fracture, crush, deform, and/or otherwise compromise the integrity of the enclosure. The forces delivered by bears are so large that failures of the enclosures tend to be catastrophic failures, whereby the enclosures and the remainder of the wildlife surveillance systems are rendered inoperable.

Therefore, the art of wildlife surveillance systems was in need of a protective case that can encapsulate a surveillance system enclosure, ensuring security as well as protection for the system in its entirety. The protective case should be capable of enduring large-scale localized and other applications of force, delivered by bears or otherwise, whereby the protective case absorbs the energy and the integrity of the wildlife surveillance system remains intact during use.

SUMMARY OF THE INVENTION

The preferred embodiments are directed toward a protective case for use with a wildlife surveillance system. The protective case resists fractures, punctures, deformations, and other failures to a greater extent than does the wildlife surveillance system itself, or its enclosure or housing.

According to one aspect of the preferred embodiment, the protective case includes a base for attaching the enclosure to a mounting substrate and a cover removably attached to the base. A cavity is defined between the base and the cover and configured for housing the wildlife surveillance system. An interlocking connector is provided for slidingly engaging the base and the cover with each other.

In another aspect of this embodiment, the interlocking connector includes corresponding pairs of slots and tabs.

According to another aspect of this embodiment, the interlocking connector includes a tab having a downwardly extending leg portion.

According to yet another aspect of this embodiment, multiple interlocking connectors are provided on opposing lateral portions of the protective case.

In another aspect of this preferred embodiment, the protective case has a perimeter defining a perimeter length, and the protective case includes multiple interlocking connectors extending about a major portion of the perimeter length.

According to another aspect of this embodiment, the cover has an upper wall that defines a recessed edge portion.

According to another aspect of this embodiment, the base has an upper wall with an elongate lip protruding therefrom.

In a further aspect of this embodiment, the base includes multiple sidewalls and at least one of the sidewalls has a slot configured to receive a portion of the wildlife surveillance system therein.

In yet another aspect of this embodiment, the cover has a front wall with at least one opening permitting a non-obscured path between a portion of the wildlife surveillance system and the surrounding area.

According to another preferred embodiment, a protective case for housing a wildlife surveillance system has a base and a cover. At least one of the base and cover is made from a material that differs from the material of the wildlife surveillance system, or its enclosure. In this embodiment, the base and/or cover material has a yield strength value greater than that of the wildlife surveillance system or its enclosure. The yield strength value of the base and/or cover material is sufficiently great in magnitude to reduce occurrences of failure when the protective case experiences localized forces that would cause failure of the surveillance system enclosure.

According to another aspect of this preferred embodiment, the base and/or cover has a yield strength value of at least about 14 MPa.

In a further aspect of this embodiment, at least one of the base and the cover is made of a material having a thickness dimension of at least about 14 gauge.

In another aspect of this preferred embodiment, at least one of the base and the cover is made of a material having a thickness dimension of at least about 12 gauge.

According to another aspect of this preferred embodiment, at least one of the base and the cover is made of a material having a thickness dimension of at least about 0.095 inch.

In yet another aspect of the preferred embodiment, at least one of the base and the cover is made from a ferrous material.

According to another aspect of this preferred embodiment, at least one of the base and the cover is made of steel.

In another aspect of this preferred embodiment, at least one of the base and the cover is made of aluminum.

According to yet another preferred embodiment, a protective case that includes a base, a cover, and a lock mechanism is provided for housing a wildlife surveillance system having user controls. In this embodiment, user controls of the surveillance system are inaccessible when the cover is secured to the base.

According to another aspect of this preferred embodiment, the lock mechanism includes multiple interfacing shackle plates, wherein each shackle plate is configured to receive a padlock shackle therethrough.

In another aspect of this preferred embodiment, a lateral plate is provided which reduces accessibility to a shackle extending through the shackle plates.

According to another aspect of this preferred embodiment, the base includes a lower wall with a slot extending thereinto. Ideally, a portion of the lock mechanism projects into the lower wall slot.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

Figure 1:
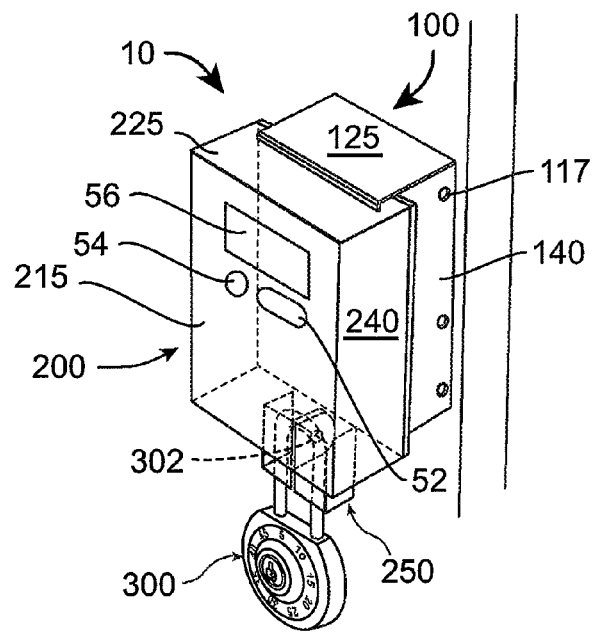
FIG. 1 is an isometric view of a protective case for use with a wildlife surveillance system according to the present invention.
Figure 2:
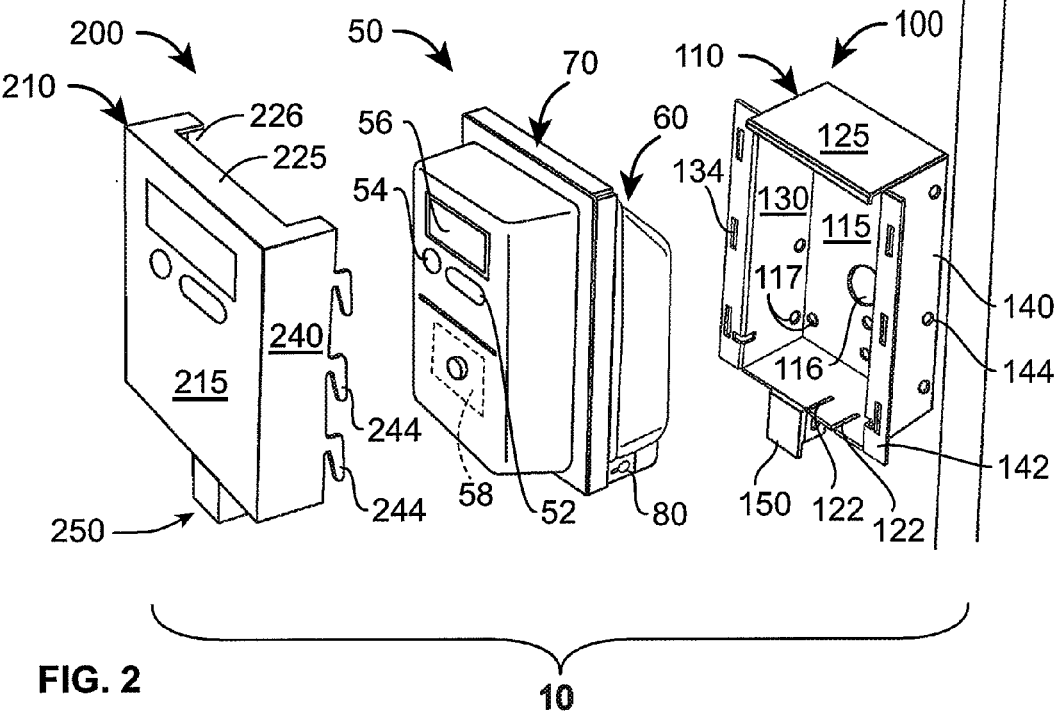
FIG. 2 is an exploded isometric view of the protective case of FIG. 1, along with a suitable wildlife surveillance system.

With initial reference to FIGS. 1 and 2, a protective case 10 for a wildlife surveillance system 50 is shown. The protective case includes a back segment or base 100 and front segment or cover 200, which, in combination, generally encapsulate the surveillance system 50 therein. A pair of lock guard assemblies 150, 250 associated with base 100 and cover 200, respectively, mate so that corresponding openings of assemblies 150, 250 are able to receive a lock 300 (e.g., a padlock) when mounted to a tree and locked. A shackle 302 of lock 300 cannot readily be accessed, thus keeping the unit secure, as described further below.

Referring now to FIG. 2, surveillance system 50 can be any of a variety of known wildlife surveillance systems. Surveillance system 50 can include a variety of desired features including, e.g., a camera window 52, a Fresnel lens 54, a flash lens 56, and various user controls 58, all housed within an enclosure 60. In some implementations, the enclosure 60 includes an elongate rib 70 that extends outwardly from a medial portion of the enclosure, about a major portion of the enclosure 60 perimeter. Accordingly, as illustrated in FIG. 2, the rib 70 can extend along lateral sidewalls and across an upper wall of the enclosure 60. The enclosure 60 can further include one or more projections, extending from a lower part of rib 70, toward the back of the surveillance system 50.

Referring again to FIGS. 1, 2, and 3, base 100 defines a void space or pocket that houses at least a portion of surveillance system 50 therein. Base 100 includes a generally planar back panel 115. Back panel 115 can include an access hole 116, for permitting access to mounting hardware on the back of the surveillance system 50, and one or more apertures 117 to facilitate mounting of base 100 to a suitable mounting substrate. Preferably, base 100, and thus protective case 10, is mounted to a tree or other wooden substrate by way of lag bolts or other suitable hardware extending through the apertures 117 of back panel 115.

Figure 3:
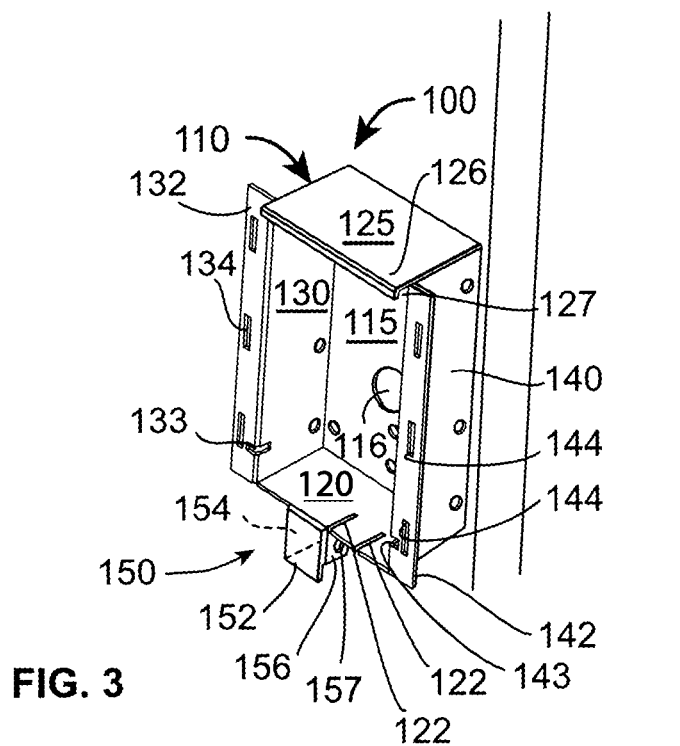
FIG. 3 is an isometric view of the base shown in FIG. 1.

Turning now to FIGS. 2 and 3, lower wall 120 extends perpendicularly from a lower edge of the back panel 115, toward the surveillance system 50. In some embodiments, the lower wall 120 includes one or more elongate slots, such as slots 122. Slots 122 extend parallel to each other, through the thickness dimension of lower wall 120. As shown, they extend only partially across the width of lower wall 120, whereby the slots 122 do not extend to and reach the back panel 115.

Figure 6:
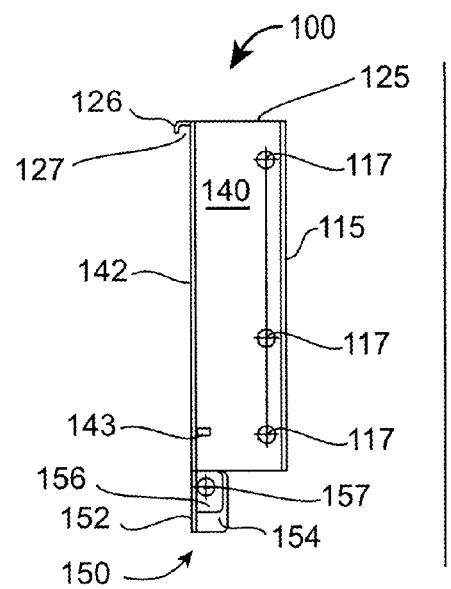
FIG. 6 is a side elevation view of the base shown in FIG. 1.

Referring now to FIGS. 2, 3, and 6, upper wall 125 extends parallel to and in the same direction as lower wall 120. A projection or lip 126 extends from the edge of upper wall 125, such that the upper wall extends outwardly beyond the remainder of base 100. Lip 126 has a downwardly turned edge that partially defines an opening or channel 127 underneath the lip 126. Channel 127 is sized, adapted, and configured to accept and hold rib 70 of the surveillance system 50.

Sidewalls 130 and 140 extend from opposing lateral edges of back panel 115, toward surveillance system 50. Each of sidewalls 130, 140 joins with upper wall 125 at a respective first end and each joins with lower wall 120 at a respective second end. The sidewalls 130 and 140 can also include apertures 117 through which lag bolts and/or other suitable mounting hardware extend.

Flanges 132 and 142 are connected to the sidewalls 130 and 140, respectively. They extend generally away from each other, yet are coplanar, and provide mounting structure that cooperates with corresponding mounting structure on the surveillance system 50 and/or cover 200.

Referring now to FIGS. 3 and 6, flanges 132, 142 include opening 133 and 143, near the lower wall 120. The openings 133, 143 extend through parts of flanges 132, 142 and preferably also through parts of sidewalls 130, 140. Openings 133, 143 are configured to receive the projections 80 of surveillance system 50, whereby the projections 80 and openings 133, 143 cooperate to support the load of surveillance system 50 by way of the respective portions of flanges 133, 143 and sidewalls 130, 140.

Referring now to FIGS. 2 and 3, each of flanges 132 and 142 includes multiple elongate slots 134, 144 that interface with corresponding mounting structure on cover 200, enabling the cover 200 to removably attach to the base 100. The slots 134, 144 are adapted and configured to function as, e.g., components of an interlocking connector assembly, which is explained in greater detail hereinafter. Preferably, the slots 134, 144 are generally aligned with each other along the respective flange 132, 142.

Figure 7:
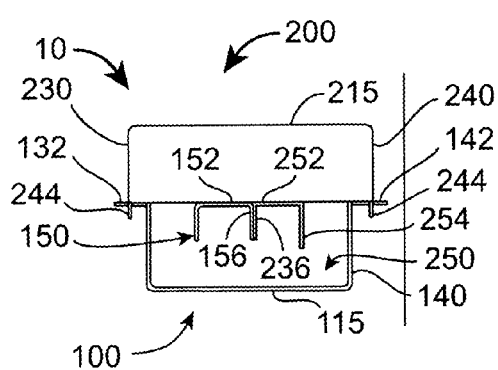
FIG. 7 is a bottom plan view of the protective case shown in FIG. 1.

Referring again to FIGS. 2, 3, and 6, part of a lock mechanism, e.g., lock guard assembly 150, is attached to the lower wall 120. Lock guard assembly 150 includes a front plate 152, extending downwardly from a bottom surface of lower wall 120, adjacent its outer edge. Lateral plate 154 and shackle plate 156 also extend from the bottom surface of lower wall 20. The lateral plate 154 and shackle plate 156 are perpendicular to the front plate 152 and are connected to opposing sides thereof. In other words, as viewed from below and as seen in FIG. 7, the lock guard assembly 150 defines a generally U-shaped profile.

Turning now to FIG. 6, an aperture 157 extends through shackle plate 156 and is sized, adapted, and configured to receive a shackle of a padlock therethrough. Preferably, lateral plate 154 is longer than shackle plate 156. In this configuration, the lateral plate 154 substantially reduces access to a padlock shackle from the side, which makes cutting or otherwise defeating the padlock shackle relatively more difficult.

Figure 4:
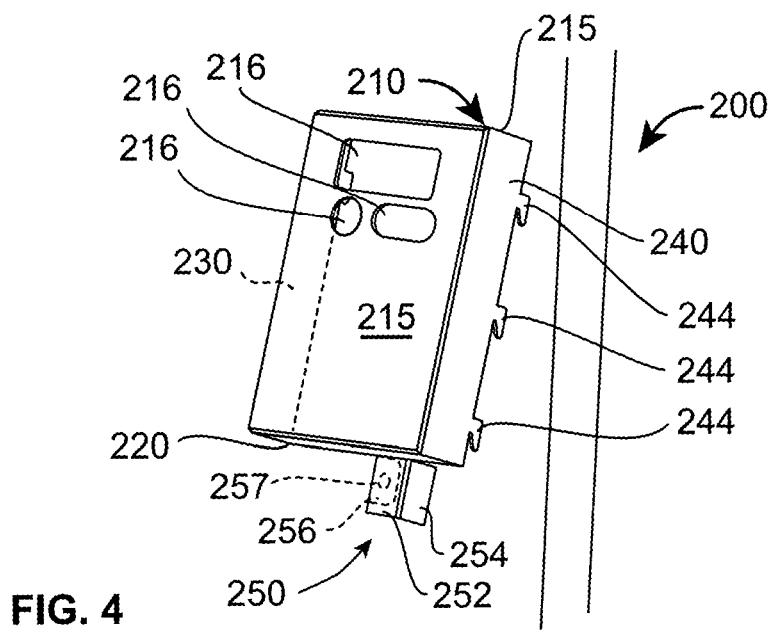
FIG. 4 is an isometric view of the cover shown in FIG. 1.

Referring next to FIGS. 1, 2, and 4, cover 200 defines a void space or pocket that houses the remainder of surveillance system 50 therein. Cover 200 includes a generally planar front panel 215 which has multiple openings 216. Each of the openings 216 is shaped, sized, and configured to overlie and permit suitable operation of various components and features of the surveillance system 50. In other words, the opening 216 is configured in a manner that corresponds to the characteristics of, e.g., camera window 52, Fresnel lens 54, and flash lens 56 of the surveillance system 50.

Figure 5:
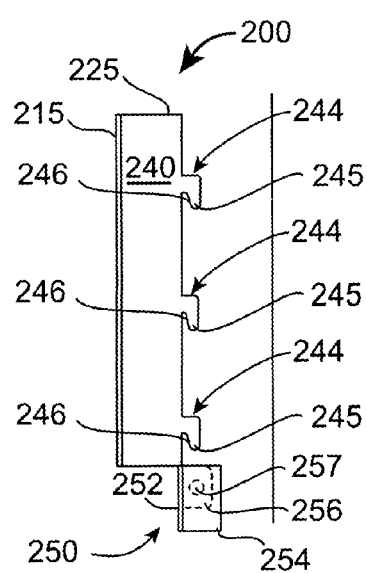
FIG. 5 is a side elevation view of the cover shown in FIG. 1.

Turning now to FIGS. 4 and 5, a lower wall 220 extends perpendicularly from a lower edge of the front panel 215, back toward the surveillance system 50. At the top of cover 200, referring now to FIGS. 1 and 2, an upper wall 225 extends parallel to and in the same direction as lower wall 220. A depression 226 extends into the upper wall 225 and is adapted and configured to receive lip 126 of base 100 therein.

Referring to FIGS. 2, 4, and 5, a pair of sidewalls 230 and 240 extends from opposing lateral edges of front panel 215 toward surveillance system 50 (FIG. 2). Each of sidewalls 230, 240 spans the entire distance between upper wall 225 and lower wall 220.

With specific reference to FIG. 5, multiple tabs 244 project outwardly from the respective sidewalls 230, 240, and function as components of the interlocking connector assembly between the base 100 and cover 200. Each of the tabs 244 is dimensioned for receipt into a respective slot 144 of the base 100. The tabs 244 have downwardly extending legs 245 that define ramped surfaces 246.

The void space between the ramped surfaces 246 and the respective edges of sidewalls 230, 240 appears angular from a side profile. Accordingly, the clearance between the leg 245 and the sidewall 230, 240 edge decreases nearer the interaction of leg 245 and the sidewall 230, 240. In this configuration, when the tabs 244 are received by slots 144, the void space between the ramped surfaces 246 and the respective sidewall 230, 240 edges captures the thickness of the base 100 flanges 130, 140 at the bottom of the slots 134. Accordingly, tabs 244 serve as, e.g., load bearing hooks that suspend the cover 200 from the base 100 by catching the flanges 130, 140 through slots 144.

Referring again to FIGS. 2, 4, and 5, lock guard assembly 250 is provided at the bottom of cover 200 and cooperates with lock guard assembly 150 which, in combination, define a lock mechanism that secures the cover 200 to the base 100. The lock guard assembly 250 is attached to the lower wall 220 and includes a front plate 252, a lateral plate 254, and a shackle plate 256. Front plate 252 extends downwardly from a bottom surface of lower wall 220, adjacent its outer edge. Lateral plate 254 and shackle plate 256 connect to and extend from outer edges of the front plate 252. Thus, like the lock guard assembly 150, assembly 250 defines a generally U-shaped profile, when viewed from below and as seen in FIG. 7.

Turning now to FIGS. 1 and 5, an aperture 257 extends through shackle plate 256 and is sized, adapted, and configured to receive a shackle of a padlock therethrough. Here too, like the corresponding components of lock guard assembly 150, preferably, the lateral plate 254 is longer than shackle plate 256. This substantially reduces access to a padlock shackle, from the side, which makes cutting or otherwise defeating the padlock shackle relatively more difficult.

Referring now to FIGS. 2, 5, and 7, preferably lateral plate 254 and shackle plate 256 extend outwardly beyond tabs 244, but in any event are received into slots 122 in the base 100 lower wall 120. Accordingly, in the complete assemblage of the protective case 10, parts of lock guard assembly 250 are received by slots 122 such that the front plates 252 and 152 lie adjacent and coplanar with each other. In such configuration, the first and second lock guard assemblies 150, 250 are substantially mirror images of each other, reflected about the shackle plates 156, 256.

Turning again to FIGS. 1 and 7, lock guard assemblies 150, 250 together define a lock assembly that thwarts access to a padlock shackle, when a padlock is secured through the shackle plates 156, 256. Furthermore, since protective case 10 is attached to a mounting substrate, accessing a padlock shackle from behind the protective case 10 is burdensome or onerous as well.

Figure 8:
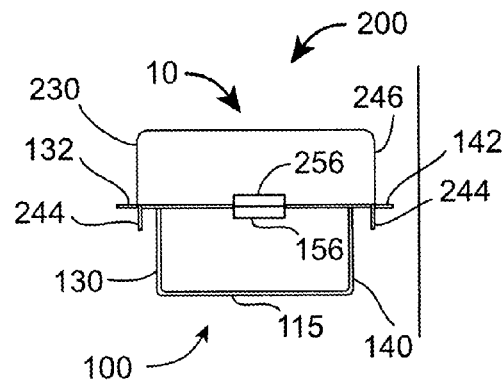
FIG. 8 is a bottom plan view of a variant of the protective case shown in FIG. 1, with an alternative configuration of the lock assembly.

Referring now to FIG. 8, in some implementations, the front plates 152, 252 and lateral plates 154, 254 are not provided. As desired, the shackle plates 156, 256 can project downwardly from lower walls 120, 220, respectively, parallel to the back and front walls 115, 215 of the base 100 and cover 200.

Notably, the protective case is preferably made of a metallic material and has only two distinct components, the base 100 and cover 200. Accordingly, each of the base 100 and cover 200 can be made from a single blank of metallic sheet material. The blank(s) is then pressed, stamped, sheared, braked, forged, and/or otherwise formed to arrive at the base 100 and cover 200 configurations.

The base 100 and cover 200 are preferably made from a ferrous material such as mild steel, but can be made from any of a variety of suitable metallic materials, e.g., aluminum, steel, stainless steel, titanium, magnesium, and their respective alloys. The thickness dimensions and other characteristics of the various components are selected based on the particular material(s) from which the base 100 and cover 200 are made, and the corresponding material properties and characteristics. In any event, the material utilized enables the assembled protective case 10 to exhibit the desired strength and durability, e.g., to endure and withstand large applications of localized force, commensurate to forces the protective case 10 could endure during a bear attack. For example, protective case 10 can be made from sheet steel that is about 14 gauge, optionally about 12 gauge, optionally about 0.05 inch or thicker preferably greater than about 0.095 inch, optionally other thicknesses as desired based on the specific properties of the particular material. For example, materials having relatively greater yield strength values can provide the desired use characteristics at relatively thinner dimensions, whilst materials having relatively lesser yield strength values require relatively thicker dimensions to provide the same desired use characteristics. In any event, the protective case 10 is preferably made from material(s) having greater yield strength than the enclosure 60 of surveillance system 50, such that the protective case 10 can survive a bear attack with little, if any, fracture type failures, or other failures which could result in damaging the surveillance system 50. The yield strength of protective case 10 can be at least about 14 MPa, at least about 16 MPa, at least about 20 MPa, and/or other values as desired.

In light of the above and referring to FIGS. 2, 3, and 4, to use the protective case 10, the user first selects the desired location for observing or monitoring wildlife. Base 100 is secured to a tree or other suitable mounting substrate, for example, by way of lag bolts or other suitable hardware extending through apertures 117. The surveillance system 50 is installed in the base 100 by first sliding rib 70 into channel 127, then inserting projections 80 into openings 133, 143.

Still referring to FIGS. 1, 2, 3 and 4, cover 200 is then mounted to base 100, over surveillance system 50. Tabs 244 are aligned with slots 144, and inserted thereinto. Simultaneously, lateral plate 254 and shackle plate 256 of lock guard assembly 250 are aligned with respective ones of slots 122 in the lower wall 120 of base 100. When the tabs 244, lateral plate 254, and shackle plate 256 are fully inserted into slots 144 and 122, respectively, the cover 200 is urged downwardly. Doing so forces the ramped surfaces 246 of tabs 244 against the lateral flanges 132, 142 of the base 100, whereby the tabs 144 hook onto the base and the cover 200 is secured thereto. Then, as desired, the shackle of a padlock is inserted through the apertures 157, 257 of the shackle plates 156, 256, and the padlock is secured with limited access thereto other than to the portion of the lock that allows a user to unlock the lock.

As this point, when the cover 200 is attached to base 100, it is apparent that the protective case 10 has significant multi-dimensional stability and rigidity between the cover 200 and base 100. Such multi-dimensional stability results from, e.g., the various interlocking components and mechanical interfacing relationships of (i) tabs 244 and slots 144, (ii) lip 126 and depression 226, (iii) shackle plates 156 and 256, (iv) lateral and shackle plates 254, 256 and slots 122, (v) a padlock shackle and shackle plates 156 and 256, and/or (vi) other interacting components of the protective case 10.

Although the best mode contemplated by the inventors of carrying out the present invention is disclosed above, practice of the present invention is not limited thereto. For example, the lock mechanism of the case can be any suitable locking arrangement that provides security similar to the interlocking shackle arrangement described herein. Moreover, though the lock mechanism is described as being integral to the protective case, lock mechanisms adapted to be coupled to the protective case are also contemplated. It will be manifest that various additions, modifications and rearrangements of the features of the present invention may be made without deviating from the spirit and scope of the underlying inventive concept.

What is claimed is:

1. A combined protective case and housed wildlife surveillance system therein, the housed wildlife surveillance system within the case including a single enclosure which encloses at least a camera and a motion detector, the protective case comprising (a) a base, (b) a cover removably attached to the base and defining with the base a cavity configured for encasing the housed wildlife surveillance system therein, and (c) a lock mechanism for securing the cover to the base, the lock mechanism including interfacing shackle plates accepting a shackle of a padlock therethrough, a pair of front plates and a pair of lateral plates being spaced from the shackle plates and lying outwardly beyond the shackle of the padlock.

2. The combined protective case and housed wildlife surveillance system therein of claim 1 further including an interlocking connector having a tab with a downwardly extending leg portion.

3. The combined protective case and housed wildlife surveillance system of claim 1 further including multiple interlocking connectors provided on adjacent lateral portions of the base and the cover.

4. The combined protective case and housed wildlife surveillance system of claim 1 wherein the base includes two sidewalls, each having a slot configured to receive projections which are part of the wildlife surveillance system therein.

5. The combined protective case and housed wildlife surveillance system therein of claim 1 wherein at least one of the base and the cover has a yield strength value of at least about 14 MPa.

6. The combined protective case and housed wildlife surveillance system therein of claim 1 wherein at least one of the base and the cover is made from a material having a thickness dimension of at least about 14 gauge.

7. The combined protective case and housed wildlife surveillance system therein of claim 1 wherein at least one of the base and the cover is made from a material having a thickness dimension of at least about 12 gauge.

8. The combined protective case and housed wildlife surveillance system therein of claim 1 wherein at least one of the base and the cover is made from a ferrous material.

9. The combined protective case and housed wildlife surveillance system therein of claim 1 wherein at least one of the base and the cover is made from steel.

10. The combined protective case and housed wildlife surveillance system therein of claim 1 further including user controls, the user controls being inaccessible when the cover is secured to the base.

11. The combined protective case and housed wildlife surveillance system therein of claim 1 wherein the pair of front plates extends between the shackle plates and the lateral plates, such that the lateral plates and front plate reduce accessibility to the shackle of the padlock from at least (i) a first lateral side of the shackle, (ii) a second lateral side of the shackle, and (iii) a position in front of the shackle.

12. The combined protective case and housed wildlife surveillance system therein of claim 1 wherein the base includes a lower wall having a slot extending thereinto, a portion of the lock mechanism projecting into the slot of the lower wall.

13. The combined protective case and housed wildlife surveillance system therein of claim 1 wherein the base is made from a non-polymeric material having a yield strength greater than a yield strength of the polymeric material.

\* \* \* \* \*